(12) United States Patent  
Dellago, Jr.

(10) Patent No.: US 9,251,331 B2
(45) Date of Patent: Feb. 2, 2016

(54) SIMPLIFIED USER REGISTRATION

(71) Applicants: Canon Information and Imaging Solutions, Inc., Melville, NY (US); Canon U.S.A., Inc., Melville, NY (US)

(72) Inventor: Robert Alfonso Dellago, Jr., Rocky Point, NY (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 94 days.

(21) Appl. No.: 14/156,929

(22) Filed: Jan. 16, 2014

(65) Prior Publication Data

US 2014/0208410 A1    Jul. 24, 2014

Related U.S. Application Data

(60) Provisional application No. 61/755,415, filed on Jan. 22, 2013.

(51) Int. Cl.
*G06F 21/34* (2013.01)
*G06F 21/33* (2013.01)
*H04L 29/06* (2006.01)

(52) U.S. Cl.
CPC .............. *G06F 21/335* (2013.01); *G06F 21/34* (2013.01); *H04L 63/0853* (2013.01); *H04L 63/0807* (2013.01); *H04L 63/0876* (2013.01); *H04L 63/104* (2013.01)

(58) Field of Classification Search
CPC ....................................................... G06F 21/34
See application file for complete search history.

(56) References Cited

U.S. PATENT DOCUMENTS

| 7,594,258 B2* | 9/2009 | Mao et al. ........................ 726/9 |
| 7,788,712 B2* | 8/2010 | Hong et al. ...................... 726/9 |

(Continued)

FOREIGN PATENT DOCUMENTS

GB        2454792 A     5/2009

OTHER PUBLICATIONS

Knowledge Base—Dell SonicWALL, Inc., Support Knowledge Base—UTM: How to Add multiple domains for LDAP User Authentication, pp. 1-5.

(Continued)

*Primary Examiner* — Kambiz Zand
*Assistant Examiner* — Thanh Le
(74) *Attorney, Agent, or Firm* — Canon USA Inc. IP Division (57) ABSTRACT

Methods, systems, and computer-readable media are provided. Some embodiments include receiving, at a computing device, a security token identifier and a request to access one or more resources of the computing device. The computing device obtains information that identifies one or more domains each having a trust relationship with the domain associated with the computing device. The computing device determines that an entry in a first data store associated with a first domain of the one or more domains matches the security token identifier. In response to the determining that an entry in the first data store matches the security token identifier, the computing device updates a local data store such that, in the local data store, the security token identifier is associated with first domain information that identifies the first domain. The computing device grants the requested access to one or more resources of the computing device.

19 Claims, 5 Drawing Sheets

(56) References Cited

U.S. PATENT DOCUMENTS

| | | | |
|---|---|---|---|
| 8,042,163 B1* | 10/2011 | Karr et al. | 726/9 |
| 8,090,693 B2* | 1/2012 | Monroe | 707/661 |
| 8,667,579 B2* | 3/2014 | Leeder | 726/20 |
| 2003/0009562 A1* | 1/2003 | Heymann et al. | 709/227 |
| 2004/0002878 A1 | 1/2004 | Maria Hinton | |
| 2006/0184646 A1 | 8/2006 | Schmidt et al. | |
| 2007/0174905 A1 | 7/2007 | Martherus et al. | |
| 2007/0234417 A1 | 10/2007 | Blakley, III et al. | |
| 2008/0130042 A1 | 6/2008 | Lizuka et al. | |
| 2008/0168539 A1 | 7/2008 | Stein | |
| 2009/0055908 A1 | 2/2009 | Rapoport | |
| 2010/0050251 A1* | 2/2010 | Speyer et al. | 726/20 |
| 2011/0289571 A1 | 11/2011 | Yasuhara | |
| 2014/0215595 A1* | 7/2014 | Prasad et al. | 726/8 |

OTHER PUBLICATIONS

The Official Microsoft ASP. NET Forums, Searching Multiple domains, pp. 1-6.

* cited by examiner

SIMPLIFIED USER REGISTRATION

CROSS-REFERENCE TO RELATED APPLICATIONS

This application claims the benefit of U.S. Provisional Application No. 61/755,415, filed Jan. 22, 2013, which is hereby incorporated by reference herein in its entirety.

TECHNICAL FIELD

The present invention relates generally to identity management, and more particularly to a system and method for managing information about a user and controlling access to a resource.

BACKGROUND

Modern computing systems often employ security measures to control access to protected resources. For example, a computing system may implement authentication and authorization processes in order to prevent unauthorized entities from accessing a protected resource. Authentication may include the computing system prompting an entity to provide a credential in order to verify the entity's identity. The authentication may be based on a username and password, a smart card and personal identification number (PIN), or other information associated with the entity. Authorization may include the computing system checking attribute information of the entity in order to verify that the entity is authorized to access the requested resource. For example, the computing system may grant or deny access to a resource based on whether the attribute information of the requesting entity satisfies predefined criteria.

A management system may be employed to manage information, such as user accounts and their associated attributes, and security processes, such as authentication and authorization processes. The computing system or application that provides the protected resource may include such a management system. That is, the computing system or application may manage the information and security processes locally using its own management system dedicated to one or more resources the computing system provides. Alternatively or additionally, the computing system or application that provides the protected resource may use a centralized management system.

A centralized management system may provide, among other things, information management and authentication services for various entities on a network. For example, the centralized management system may manage user accounts for network participants as well as accounts for network resources. When a user tries to access a network resource, the centralized management system, using the account information, may authenticate the user and determine whether the user is authorized to access the resource. Then, only authenticated users who are authorized to access the protected resource may be granted access.

User accounts may be added or deleted, and account attributes may be modified. If a security token, such as a smart card, is to be used for user authentication, the security token must be registered to associate the user account with the security token. Once registered, the security token may be used to gain access to a protected resource on the network.

BRIEF SUMMARY OF THE INVENTION

Methods, systems, and computer-readable media for managing information about a user and controlling access to a resource are disclosed.

Some embodiments of the invention include receiving, at a computing device, a security token identifier and a request to access one or more resources of the computing device, the security token identifier comprising information that identifies a security token. The computing device sends to a server computing system a request to identify domains having a trust relationship with a domain associated with the computing device. The computing device receives from the server computing system a response to the request to identify domains having a trust relationship with the domain associated with the computing device, the response comprising information that identifies one or more domains each having a trust relationship with the domain associated with the computing device. The computing device determines that an entry in a first data store matches the security token identifier, the first data store associated with a first domain of the one or more domains each having a trust relationship with the domain associated with the computing device. In response to the determining that an entry in the first data store matches the security token identifier, the computing device updates a local data store at the computing device such that, in the local data store, the security token identifier is associated with first domain information that identifies the first domain. The computing device grants the requested access to one or more resources of the computing device.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1:
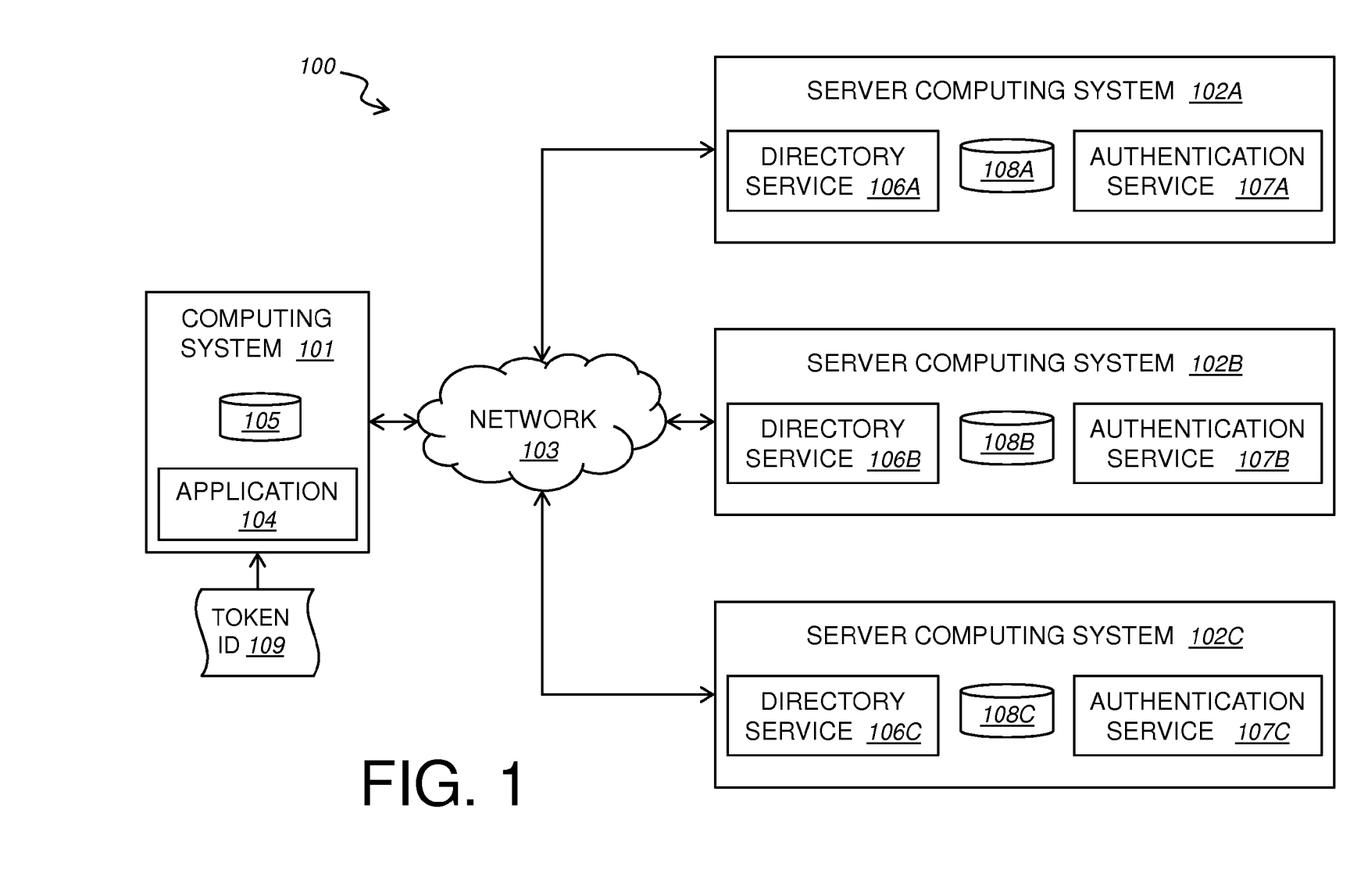
FIG. 1 illustrates an example network environment.

Embodiments of the present invention are described with reference to the drawings. FIG. 1 illustrates an example network environment 100. A computing system 101, a server computing system 102A, a server computing system 102B, and a server computing system 102C are connected to a network 103. The computing system 101 has an application 104 and a data store 105, and each of the server computing systems 102A,102B,102C have a directory service 106A,106B,106C, an authentication service 107A,107B,107C, and a data store 108A,108B,108C, respectively.

The computing system 101 includes hardware, software, or both for providing the functionality of the computing system 101. In some embodiments, the computing system 101 is unitary. In some embodiments, the computing system 101 is distributed. The computing system 101 may span multiple locations. The computing system 101 may span multiple machines.

In some embodiments, the computing system 101 performs one or more steps of one or more methods described or illustrated herein. In some embodiments, the computing system 101 provides functionality described or illustrated herein. In some embodiments, software running on the computing system 101 performs one or more steps of one or more methods described or illustrated herein or provides functionality described or illustrated herein. Particular embodiments include one or more portions of the computing system 101.

The application 104 includes programs and related data. In some embodiments, the application 104 may include one or more programs for controlling access to one or more resources of the computing system 101. In some embodiments, the application 104 executing on the computing system 101 performs one or more steps of one or more methods described or illustrated herein or provides functionality described or illustrated herein. By way of example and not by way of limitation, programs of the application 104 may include instructions which, when executed by one or more processors, cause the one or more processors to perform one or more operations described with respect to FIG. 2.

The application 104 executing on the computing system 101 may provide functionality for maintaining and accessing information stored in the data store 105. In some embodiments, the data store 105 comprises a database. The computing system 101, when executing the application 104, may perform various operations with respect to the data store 105. Examples of operations include adding entries to the data store 105; deleting entries from the data store 105; modifying entries in the data store 105; searching for entries in the data store 105; and retrieving entries from the data store 105. In some embodiments, information stored in the data store 105 includes user information. For example, a user account in the data store 105 may include the following information: user identification information (for example, a username); domain information (for example, a domain identifier such as a Domain Name System (DNS) domain name); and security token information (for example, a token identifier such as the identification number of a smart card).

In some embodiments, the application 104 may include one or more programs for accessing services, such as a directory service or an authentication service. For example, the application 104 may cause the computing system 101 to send to an authentication service on the network 103 a request to authenticate a user before the user is granted access to a resource of the computing system 101. In some embodiments, the computing system 101 sends a request for a network service in response to receiving a token identifier 109 at the computing system 101.

The token ID 109 may be a string of characters (for example, numbers, letters, symbols, or a combination of these) that identifies a security token. By way of example, the security token may be a smart card (for example, a proximity card), a mobile device, or other security token. The computing system 101 may receive the token ID 109 via a smart card reader, radio-frequency identification (RFID) reader, a near field communication (NFC) interface (for example, an NFC reader), or other suitable device. In some embodiments, the computing system 101 includes one or more of these devices for receiving the token ID 109. In some embodiments, the computing system 101 is coupled to one or more of these devices via one or more input/output (I/O) port(s) of the computing system 101.

The server computing system 102A includes hardware, software, or both for providing the functionality of the server computing system 102A. The server computing system 102A may include one or more servers. For example, the server computing system 102A may include one or more application (s) servers, name servers, file servers, database servers, mail servers, or web servers. In some embodiments, the server computing system 102A is unitary. In some embodiments, the server computing system 102A is distributed. The server computing system 102A may span multiple locations. The server computing system 102A may span multiple machines.

The server computing system 102A may provide network services for entities within the network 103. In some embodiments, the server computing system 102A provides centralized management of account information and security processes for entities within the network 103. Examples of network services the server computing system 102A may provide include directory services, authentication services, naming services, and secure access to resources on the network 103. The server computing system 102A may provide one or more network services for network entities, such as computing systems or users within the network 103.

The server computing system 102A includes the directory service 106A, the authentication service 107A, and the data store 108A. These components of the server computing system 102A reside in the server computing system 102A in any suitable manner. For example, these components may reside on one or multiple servers. In some embodiments, one or more of these components may be provided as part(s) of a software application. In some embodiments, one or more of these components may be provided as a stand-alone software application.

The directory service 106A may be used for maintaining and accessing information stored in the data store 108A. In some embodiments, the data store 108A comprises a database. In some embodiments, the directory service 106A uses Lightweight Directory Access Protocol (LDAP) to interact with information in the data store 108A. The directory service 106A may perform various operations with respect to the data store 108A. Examples of operations include adding entries to the data store 108A; deleting entries from the data store 108A; modifying entries in the data store 108A; searching for entries in the data store 108A; and retrieving entries from the data store 108A.

In some embodiments, information stored in the data store 108A is organized into a hierarchy of objects. Each object may represent an entity within the network 103. By way of example, entities within the network 103 may be users, computing devices, applications, services, groups, or other suitable entities. In some embodiments, each object has a unique identifier and contains a set of attributes. Attributes for a user account may include, for example, the user's password, a smart card identification number, or group membership information indicating a group to which the user belongs. The information stored in the data store 108A may further include trust information about a trust relationship existing between domains.

The authentication service 107A may be used to authenticate network entities seeking access to resources on the network 103. In some embodiments, the authentication service 107A uses the Kerberos protocol to authenticate network entities. The authentication service 107A may comprise a key distribution center (KDC). In response to a service request, the authentication service 107A may access account information of the entity that sent the service request. In some embodiments, the account information comprises an object and its attributes stored in the data store 108A.

In some embodiments, an LDAP-compliant directory service is running on the server computing system 102A. In some embodiments, ACTIVE DIRECTORY is running on the server computing system 102A.

The above description of the server computing system 102A, the directory service 106A, the authentication service 107A, and the data store 108A also applies to the server computing system 102B, the directory service 106B, the authentication service 107B, and the data store 108B, respectively. Moreover, the above description of the server computing system 102A, the directory service 106A, the authentication service 107A, and the data store 108A also applies to the server computing system 102C, the directory service 106C, the authentication service 107C, and the data store 108C, respectively. In some embodiments, the server computing system 102A provides network services for entities in a first domain, the server computing system 102B provides network services for entities in a second domain, and the server computing system 102C provides network services for entities in a third domain. In some embodiments, the objects for the first domain are stored in the data store 108A, the objects for the second domain are stored in the data store 108B, and the objects for the third domain are stored in the data store 108C. In some embodiments, each of the first domain, the second domain, and the third domain is identified by a DNS domain name.

The network 103 couples one or more servers and one or more clients to each other. The network 103 may be any suitable network. For example, one or more portions of the network 103 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 103 may include one or more networks.

Figure 2:
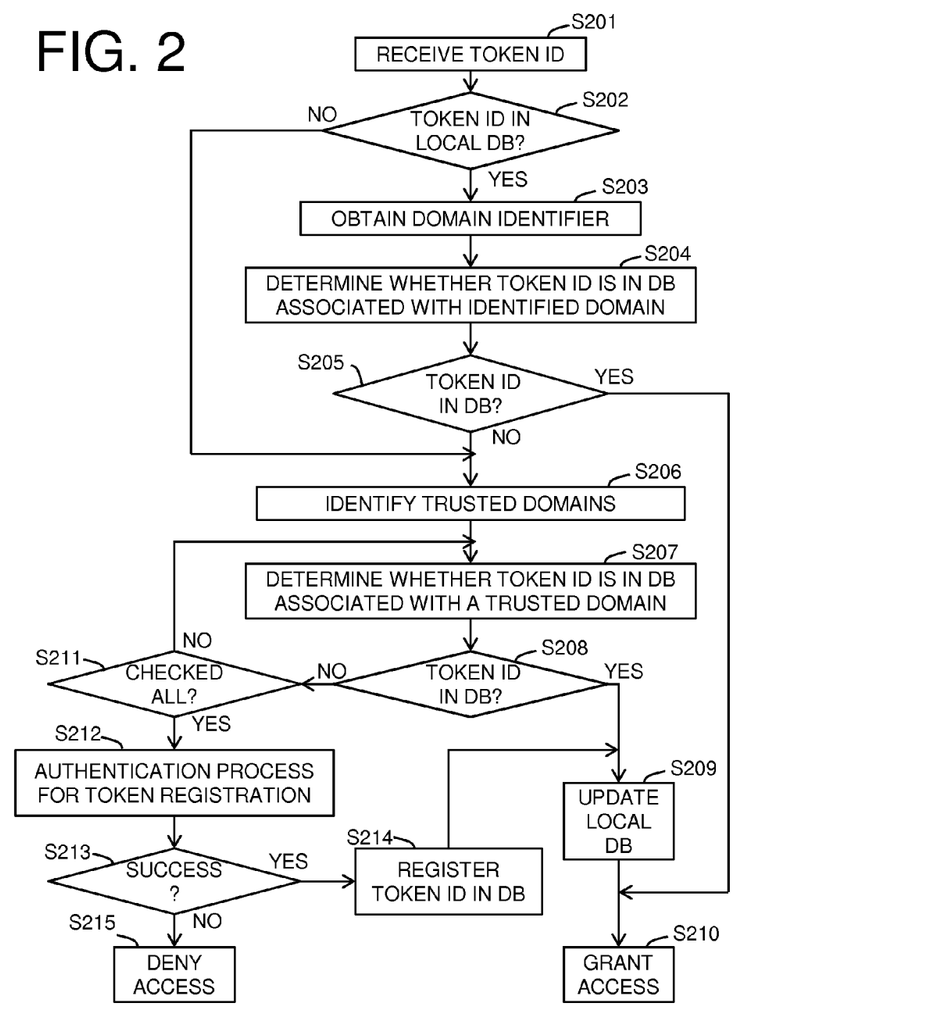
FIG. 2 illustrates an example flow of operations at a computing system.

FIG. 2 is described with reference to the example network environment 100 of FIG. 1. FIG. 2 illustrates an example flow of operations at the computing system 101.

In step S201, the computing system 101 receives the token ID 109. The computing system 101 may receive the token ID 109 via a data input device such as a smart card reader, RFID reader, an NFC reader, or other suitable device. In some embodiments, the computing system 101 includes the data input device. In some embodiments, the computing system 101 includes one or more I/O port(s) and the data input device is an external device connected to an I/O port of the computing system 101. A user may present a security token to the data input device in order to log on to the computing system 101 or to access a resource provided by the computing system 101. By way of example, the security token may be a smart card (for example, a proximity card), a mobile device, or other security token.

In step S202, the computing system 101 determines whether an entry in the data store 105 matches the token ID 109 received in step S201. For example, the computing system 101 may search the data store 105 and compare the token ID 109 received in step S201 to entries in the data store 105. In some embodiments, the data store 105 includes one or more user accounts. A user account may include the following entries: a username; a domain identifier such as a domain name; and a token identifier such as a smart card identification number. In some embodiments, the computing system 101 searches the data store 105 and compares the token ID 109 received in step S201 to user account data.

In a case that the computing system 101 determines in step S202 that no entry in the data store 105 matches the token ID 109 (no in step S202), the process continues to step S206. In some embodiments, a match for the token ID 109 may not be found in step S202 because the data store 105 does not include user account information. For example, the computing system 101 may be a new device for which user information has not yet been entered.

In a case that the computing system 101 determines in step S202 that an entry in the data store 105 matches the token ID 109 (yes in step S202), the process continues to step S203. For example, in some embodiments, the data store 105 includes a user account that contains a token identifier as an entry and the token identifier matches the token ID 109 received in step S201.

In step S203, the computing system 101 obtains a domain identifier associated with the token ID 109. In some embodiments, the domain identifier is associated with the token ID 109 by virtue of the fact that the domain identifier and the token ID 109 are each entries in the same user account in the data store 105. In some embodiments, the computing system 101 obtains the domain identifier from the data store 105. For example, the computing system 101 may retrieve the domain identifier from the user account identified in step S202 as the user account containing the matching entry for the token ID 109. In some embodiments, the domain identifier may be a DNS domain name. The domain identifier identifies a domain. For example, the domain identifier may identify Domain A, Domain B, or Domain C, which are example domains described with respect to FIG. 3.

Figure 3:
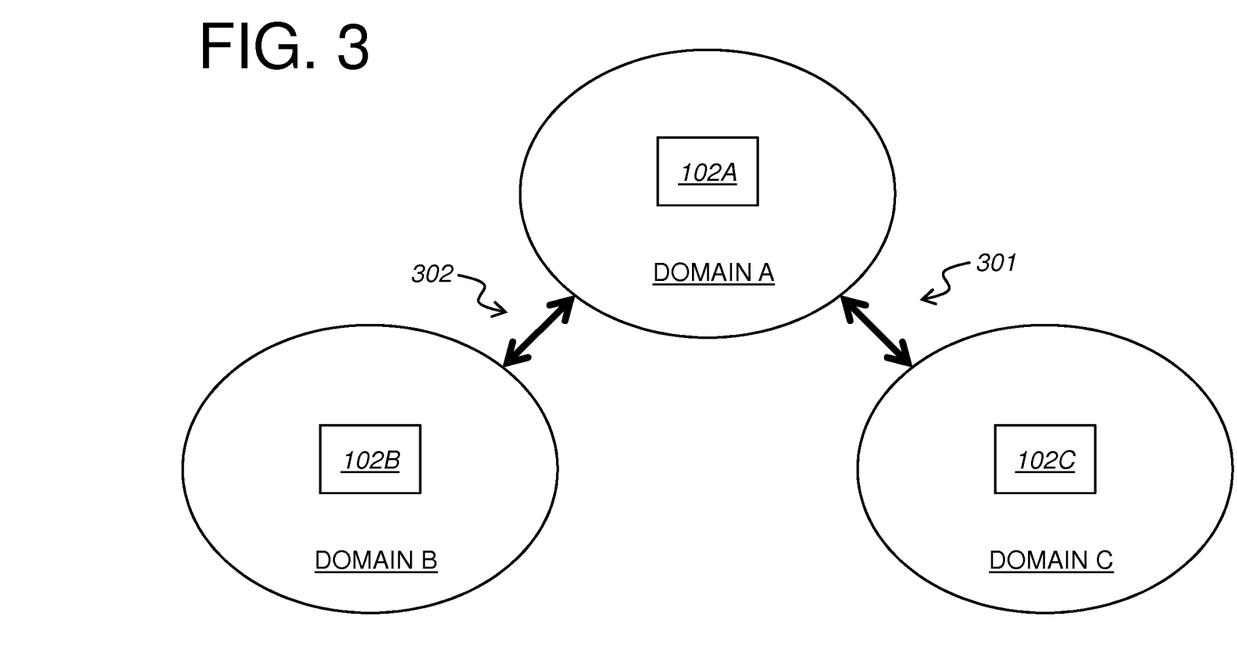
FIG. 3 illustrates an example computing environment in which embodiments of the invention may be implemented.

For illustration purposes, operations performed in various steps of FIG. 2 are described with reference to the example computing environment of FIG. 3. In FIG. 3, the server computing systems 102A, 102B, 102C of FIG. 1 are illustrated. The server computing system 102A provides network services for entities in a first domain (Domain A), the server computing system 102B provides network services for entities in a second domain (Domain B), and the server computing system 102C provides network services for entities in a third domain (Domain C). The objects for Domain A are stored in the data store 108A of FIG. 1, the objects for Domain B are stored in the data store 108B of FIG. 1, and the objects for Domain C are stored in the data store 108C of FIG. 1. In some embodiments, each of Domain A, Domain B, and Domain C is identified by a DNS domain name. A trust relationship 301 exists between Domain A and Domain C, and a trust relationship 302 exists between Domain A and Domain B.

Referring again to step S203, in step S203 the computing system 101 obtains a domain identifier that identifies a domain. By way of example, the domain identifier may identify Domain B of FIG. 3.

In step S204, the computing system 101 determines whether an entry in a database associated with the domain identified in step S203 matches the token ID 109. Using the domain identifier obtained in step S203, the computing system 101 may locate the relevant server computing system that provides network services for entities in the identified domain. In a case that the domain identified in step S203 is Domain B, the computing system 101 then determines in step S204 whether an entry in the data store 108B matches the token ID 109. In some embodiments, step S204 includes the computing system 101 using a directory service at the server computing system 102B to determine whether an entry in the database matches the token ID 109. For example, the computing system 101 may send a search request to the directory service 106B. The computing system 101 may request the directory service 106B to perform a search operation using the LDAP protocol to search the data store 108B for an entry that matches the token ID 109. The directory service 106B may search the data store 108B and compare the token ID 109 to entries in the data store 108B. The computing system 101 may then receive from the directory service 106B a result of the search performed by the directory service 106B. For example, the computing system 101 may receive an indication that an entry in the data store 108B matched the token ID 109 or an indication that no entry in the data store 108B matched the token ID 109.

In a case that an entry in the database associated with the domain identified in step S203 matches the token ID 109 (yes in step S205), the process continues to step S210. In step S210, the user is logged on to the computing system 101 and/or the user is granted access to a resource provided by the computing system 101.

On the other hand, in a case that no entry in the database associated with the domain identified in step S203 matches the token ID 109 (no in step S205), the process continues to step S206. In this scenario, an inconsistency may exist between a local user account in the data store 105 and the domain user account. For example, the data store 105 at the computing system 101 includes the token ID 109 (yes in step S202) but the user account which includes the token ID 109 contains a domain identifier which identifies a domain that does not include the token ID 109 in its data store (no in step S205).

In step S206, the computing system 101 identifies the domains having a trust relationship with the domain the computing system 101 is configured to use for network services. In step S206, the computing system 101 determines the server computing system that provides network services for the computing system 101 by checking configuration information. The configuration information for the computing system 101 may be stored locally at the computing system 101 or may be stored remotely. The configuration information contains a domain identifier that identifies the domain for which the computing system 101 is configured. By way of example, the domain identifier may identify Domain A of FIG. 3.

Still referring to step S206, the computing system 101 next determines the domains having a trust relationship with the domain the computing system 101 is configured for. Using the domain identifier found in the configuration information, the computing system 101 may locate the relevant server computing system that provides network services for the computing system 101. In a case that the domain identified is Domain A, the computing system 101 then uses the directory service 106A at the server computing system 102A to determine the domains having a trust relationship with Domain A. For example, the computing system 101 may send a request to the directory service 106A to perform a search operation using the LDAP protocol to search the data store 108A for trust relationship information. The directory service 106A may search the data store 108A for all domains having a trust relationship with Domain A, including any tree root domains or child domains that are subordinate to Domain A. The computing system 101 may then receive from the directory service 106A a result of the search performed by the directory service 106A. In some embodiments, the search results comprise a list of all domains that allow users in Domain A to access resources. For example, the computing system 101 may receive a list including Domain A and those domains having a trust relationship with Domain A. Further by way of example, the list of domains returned to the computing system 101 may include Domain A, Domain B, and Domain C.

In step S207, the computing system 101 determines whether an entry in a database associated with a domain provided in step S206 matches the token ID 109. In some embodiments, the computing system 101 proceeds to check each domain serially in the order listed on the results received in step S206. Using the domain identifier listed on the results obtained in step S206, the computing system 101 may locate the relevant server computing system that provides network services for entities in the identified domain. In a case that the first domain identified in step S206 is Domain A, the computing system 101 then determines in step S207 whether an entry in the data store 108A matches the token ID 109. In some embodiments, step S207 includes the computing system 101 using a directory service at the server computing system 102A to determine whether an entry in the database matches the token ID 109. For example, the computing system 101 may send a search request to the directory service 106A. The computing system 101 may request the directory service 106A to perform a search operation using the LDAP protocol to search the data store 108A for an entry that matches the token ID 109. The directory service 106A may search the data store 108A and compare the token ID 109 to entries in the data store 108A. The computing system 101 may then receive from the directory service 106A a result of the search performed by the directory service 106A. For example, the computing system 101 may receive an indication that an entry in the data store 108A matched the token ID 109 or an indication that no entry in the data store 108A matched the token ID 109.

In a case that an entry in a database associated with a domain provided in step S206 matches the token ID 109 (yes in step S208), the process continues to step S209.

In step S209, the computing system 101 updates the data store 105. For example, in some embodiments, the computing system 101 may add a user account to the data store 105. The user account added to the data store may include, for example, the following entries: user identification information (for example, a username); domain information (for example, a domain identifier such as a DNS domain name); and security token information (for example, a token identifier such as the identification number of a smart card). In some embodiments, information added to the data store 105 is obtained from the remote data store that contained the token ID 109.

Still referring to step S209, the computing system 101 may update the data store 105 by adding, deleting and/or modifying an entry of an already existing user account. For example, the computing system 101 may update domain information (for example, a domain identifier such as a DNS domain name). In some embodiments, the information added to the data store 105 is obtained from the remote data store that contained the token ID 109. By way of example, in some embodiments, a user account may have been removed from one domain and added to a different domain. However, the data store 105 on the computing system 101 may not yet have been updated with the new domain information associated with the user account.

After the computing system 101 updates the data store 105 in step S209, the process continues to step S210. In step S210, the user is logged on to the computing system 101 and/or the user is granted access to a resource provided by the computing system 101.

Referring again to step S208, in a case that no entry in a database associated with a domain provided in step S206 matches the token ID 109 (no in step S208), the process continues to step S211.

In step S211, the computing system 101 determines whether all domains listed in the results received in step S206 have been checked. In a case the computing system 101 determines that at least one domain has not been checked (no in step S211), the process continues to step S207. In such a case, the computing system 101 repeats the operations of step S207 described above, except that the operations are performed with respect to a domain that has not been checked. In a case the computing system 101 determines that all domains have been checked (yes in step S211), the process continues to step S212.

In step S212, the computing system 101 initiates a process to authenticate a user for the purpose of registering the token ID 109. In step S212, the computing system 101 prepares a login page for display. The login page may include information corresponding to the appropriate credential necessary for login. For example, the login page may include fields for receiving data. In some embodiments, the login page includes fields for the user to provide a username, a password, a domain identifier, other information, or a combination of these.

In some embodiments, the computing system 101 receives the credentials via an operation panel. For example, the user may provide a username and password for authenticating the identity of the user. In some embodiments, the computing system 101 then sends the credentials to an authentication service with a request to authenticate the user. For example, in some embodiments, a domain identifier may be provided with the credentials. Then the credentials may be sent to the authentication service associated with the domain identified by the domain identifier. By way of example, the domain identifier may identify Domain C.

Still referring to step S212, the computing system 101 sends a request to the authentication service 107C to authenticate the user seeking access to the computing system 101. In some embodiments, the authentication service 107C uses the Kerberos protocol to authenticate the user. In response to the service request, the authentication service 107C may access account information of the user. In some embodiments, the account information comprises an object and its attributes stored in the data store 108C. The authentication service 107C may use the provided username and password and the data stored in the data store 108C to authenticate the user. The authentication service 107C then sends an authentication response to the computing system 101 indicating whether the authentication was successful or whether the authentication failed.

In response to determining at the computing system 101 that the authentication succeeded (yes in step S213), the process continues to step S214. In step S214, the computing system 101 registers the token ID 109 in the data store associated with the domain in which the user was authenticated in step S212. For example, the computing system 101 sends a request to the directory service 106C to perform an operation to add an entry to the data store 108C. The computing system 101 may request the directory service 106C to add the token ID 109 to the user's account in the data store 108C. After the token ID 109 is registered, the process continues to step S209 and S210 described above.

On the other hand, in response to determining at the computing system 101 that the authentication failed (no in step S213), the process continues to step S215. In step S215, the computing system 101 performs processing in response to the login failure. For example, the computing system 101 may prepare and cause to be displayed information indicating to the user that authentication has failed or that the user is denied access to one or more resources of the computing system 101. The displayed information may include a request that the user provide a credential again or provide a different type of credential, for example.

Figure 4:
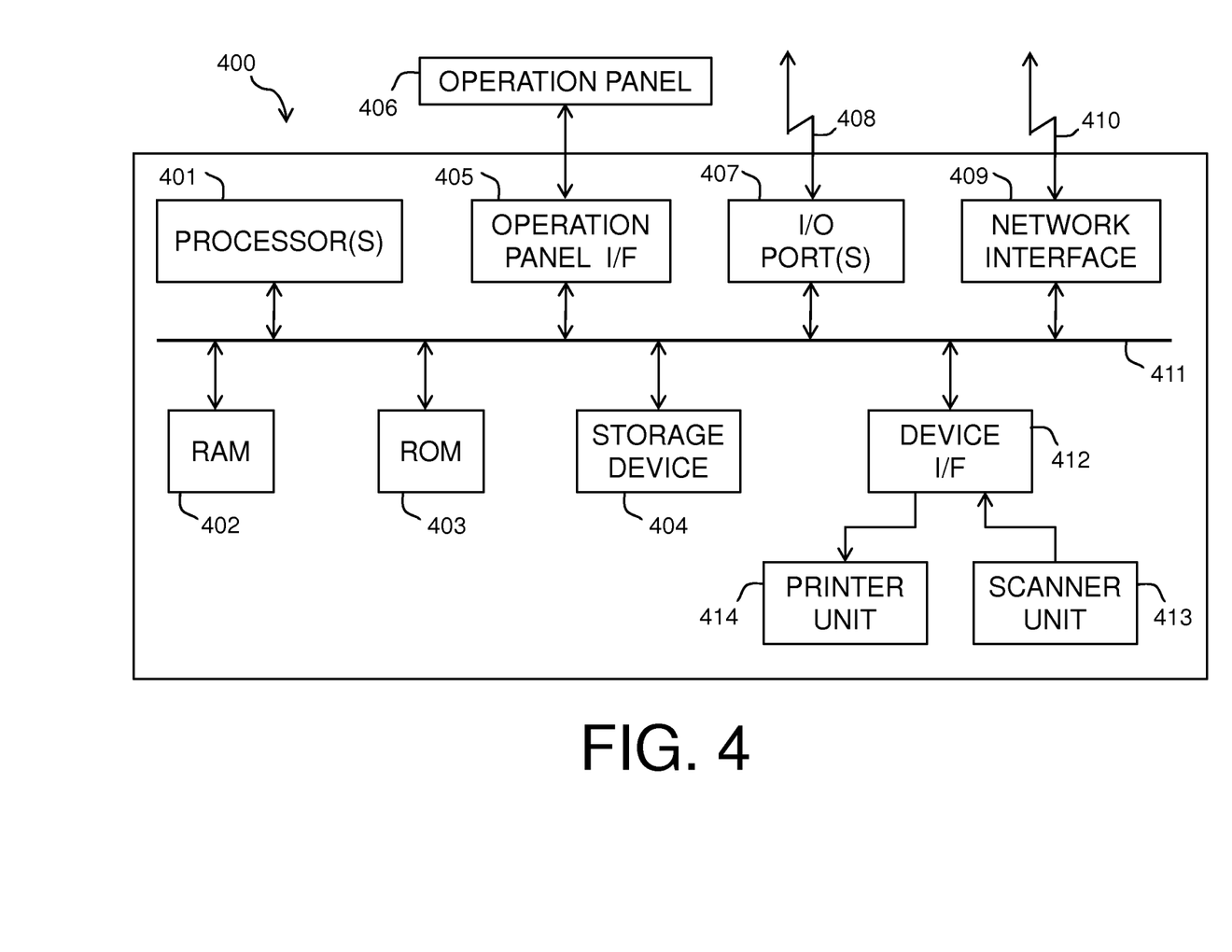
FIG. 4 illustrates an example image processing device.

FIG. 4 illustrates an example image processing device 400. In some embodiments, the image processing device 400 includes the computing system 101 of FIG. 1. For example, in some embodiments, the computing system 101 is embedded in the image processing device 400. In some embodiments, the computing system 101 of FIG. 1 comprises the image processing device 400.

The image processing device 400 of FIG. 4 is a multifunction peripheral having scanning, printing, copying, and other functions. However, it will be understood that various other implementations of an image processing device are within the scope of the present invention. For example, various components, modules, functions, and/or configurations of the image processing device 400 of FIG. 4 could be combined, deleted, or modified to form further implementations.

In some embodiments, the image processing device 400 performs one or more steps of one or more methods described or illustrated herein. In some embodiments, the image processing device 400 provides functionality described or illustrated herein. In some embodiments, software running on the image processing device 400 performs one or more steps of one or more methods described or illustrated herein or provides functionality described or illustrated herein. Particular embodiments include one or more portions of the image processing device 400.

The image processing device 400 includes one or more processor(s) 401. The processor(s) 401 include a central processing unit (CPU) that performs overall control functions for the image processing device 400. The CPU uses a random access memory (RAM) 402 as a work area while executing instructions. The CPU executes instructions of various programs stored in one or more memory devices. For example, the CPU executes programs stored in a read only memory (ROM) 403 and in a storage device 404.

In some embodiments, the processor(s) 401 include one or more processors in addition to the CPU. By way of example, the processor(s) 401 may include one or more general-purpose microprocessor(s), application-specific microprocessor(s), and/or special purpose microprocessor(s). Additionally, in some embodiments the processor(s) 401 may include one or more internal caches for data or instructions.

The processor(s) 401 provide the processing capability required to execute an operating system, application programs, and various other functions provided on the image processing device 400. The processor(s) 401 perform or cause components of the image processing device 400 to perform various operations and processes described herein, in accordance with instructions stored in one or more memory devices.

The RAM 402 is used as a work area when the processor(s) 401 execute various instructions, such as those making up computer programs stored in the ROM 403 and/or the storage device 404. The RAM 402 may be used as a temporary storage area for various data, including input image data. The RAM 402 may be used as a cache memory. In some embodiments, the RAM may be dynamic RAM (DRAM) or static RAM (SRAM).

The ROM 403 stores data and programs having computer-executable instructions for execution by the processor(s) 401. In some embodiments, the ROM 403 is a boot ROM, storing instructions for the booting process. In some embodiments, the ROM 403 may be flash memory.

The storage device 404 stores application data, program modules and other information. One or more program modules stored in the storage device 404 are configured to cause various operations and processes described herein to be executed. In some embodiments, the application 104 resides on the storage device 404 and executes on the image processing device 400.

The storage device 404 also stores other programs and data to be processed. For example, the storage device 404 stores an operating system including programs and data for managing hardware and software components of the image processing device 400. Applications on the image processing device 400 may utilize the operating system to perform various operations. The storage device 404 may further store other programs and/or drivers that enable various functions of the image processing device 400, graphical user interface (GUI) functions, and/or processor functions. The storage device 404 may also store data files including, for example, image data, user data, configuration information, GUI components, such as graphical elements or templates, or other data required by the image processing device 400.

In some embodiments, the image processing device 400 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 400. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 405 provides output signals to and receives input signals from an operation panel 406. Regarding the output signals, the operation panel interface 405 provides GUI data to the operation panel 406 for display on a liquid crystal display (LCD). Regarding the input signals, the operation panel interface 405 receives input signals based on user input operations at the operation panel 406 and relays the input signals to the processor(s) 401. In some embodiments, the operation panel 406 includes a touch sensitive element operable to receive user input operations or commands based on the touching of graphical objects displayed on the LCD. In some embodiments, the operation panel 406 includes a hard key panel.

The image processing device 400 includes one or more input/output (I/O) port(s) 407. The I/O port(s) 407 may include any suitable interface type such as a universal serial bus (USB) port, FireWire port (IEEE-1394), serial port, parallel port, or AC/DC power connection port. The I/O port(s) 407 enable one or more external device(s) 408 to communicate with the image processing device 400 when the external device(s) 408 is/are connected to the I/O port(s) 407. Examples of external devices 408 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 409 includes hardware, software, or both providing one or more interfaces for communication (such as, for example, packet-based communication) between the image processing device 400 and one or more other computing systems or one or more networks 410. As an example and not by way of limitation, the network interface 409 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 409 for it. As an example and not by way of limitation, the image processing device 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the image processing device 400 may communicate with a wireless PAN (WPAN) (such as, for example, a BLUETOOTH WPAN), a WI-FI network, a WI-MAX network, or other suitable wireless network or a combination of two or more of these. The image processing device 400 may include any suitable network interface 409 for any of these networks 410, where appropriate.

A system bus 411 interconnects various components of the image processing device 400 thereby enabling the transmission of data and execution of various processes. The system bus 411 may include one or more types of bus structures including a memory bus or memory controller, a peripheral bus, and a local bus using any of a variety of bus architectures.

The device interface 412 is connected to the scanner unit 413 and to the printer unit 414. The device interface 412 performs synchronous/asynchronous conversion of image data.

The scanner unit 413 includes a light source and an image sensor. The scanner unit 413 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 413 includes an optical system (for example, mirrors, lens) that directs the light to the image sensor. After the image sensor generates the electrical signals, an analog-to-digital converter converts the electrical signals to digital image data representing the scanned physical document. The scanner unit 413 then outputs the digital image data to one or more other components of the image processing device 400 via the device interface 412.

The printer unit 414 is an image output device for printing on a sheet an image corresponding to image data. In response to a print command received at the image processing device 400, the printer unit 414 receives image data via the device interface 412 and outputs to a sheet an image corresponding to the image data.

Figure 5:
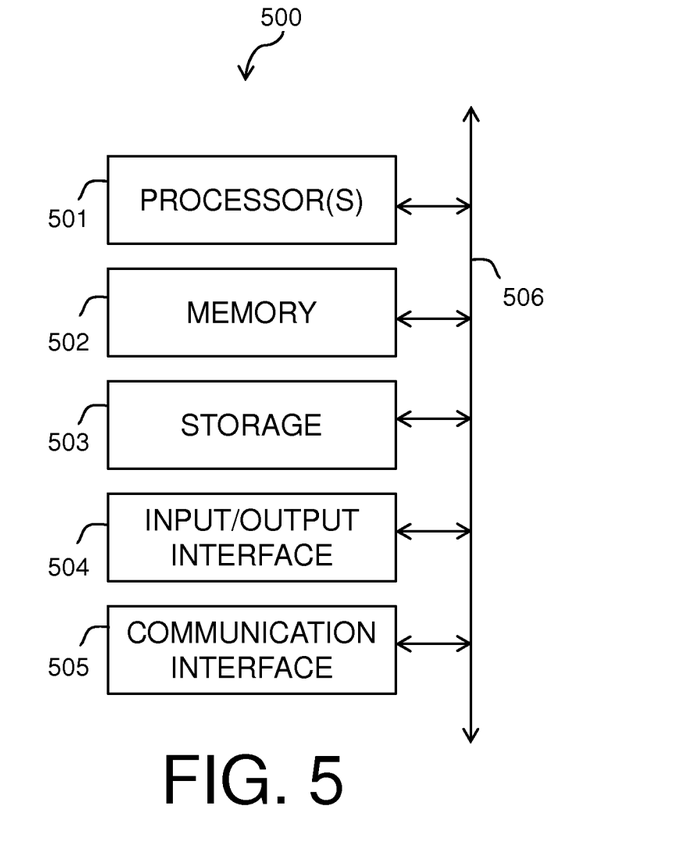
FIG. 5 illustrates an example computing system.

FIG. 5 illustrates an example computing system 500. According to various embodiments, all or a portion of the description of the computing system 500 is applicable to all or a portion of one or more of the computing system 101, the server computing system 102A, the server computing system 102B, and the server computing system 102C.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 500 performs one or more steps of one or more methods described or illustrated herein. In some embodiments, the computing system 500 provides functionality described or illustrated herein. In some embodiments, software running on the computing system 500 performs one or more steps of one or more methods described or illustrated herein or provides functionality described or illustrated herein. Some embodiments include one or more portions of the computing system 500.

The computing system 500 includes one or more processor(s) 501, memory 502, storage 503, an input/output (I/O) interface 504, a communication interface 505, and a bus 506. The computing system 500 may take any suitable physical form. For example, and not by way of limitation, the computing system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The processor(s) 501 include hardware for executing instructions, such as those making up a computer program. The processor(s) 501 may retrieve the instructions from the memory 502, the storage 503, an internal register, or an internal cache. The processor(s) 501 then decode and execute the instructions. Then, the processor(s) 501 write one or more results to the memory 502, the storage 503, the internal register, or the internal cache. The processor(s) 501 may provide the processing capability to execute the operating system, programs, user and application interfaces, and any other functions of the computing system 500.

The processor(s) 501 may include a central processing unit (CPU), one or more general-purpose microprocessor(s), application-specific microprocessor(s), and/or special purpose microprocessor(s), or some combination of such processing components. The processor(s) 501 may include one or more graphics processors, video processors, audio processors and/or related chip sets.

In some embodiments, the memory 502 includes main memory for storing instructions for the processor(s) 501 to execute or data for the processor(s) 501 to operate on. By way of example, the computing system 500 may load instructions from the storage 503 or another source to the memory 502. During or after execution of the instructions, the processor(s) 501 may write one or more results (which may be intermediate or final results) to the memory 502. One or more memory buses (which may each include an address bus and a data bus) may couple the processor(s) 501 to the memory 502. One or more memory management units (MMUs) may reside between the processor(s) 501 and the memory 502 and facilitate accesses to the memory 502 requested by the processor(s) 501. The memory 502 may include one or more memories. The memory 502 may be random access memory (RAM).

The storage 503 stores data and/or instructions. As an example and not by way of limitation, the storage 503 may include a hard disk drive, a floppy disk drive, flash memory, an optical disc, a magneto-optical disc, magnetic tape, or a Universal Serial Bus (USB) drive or a combination of two or more of these. In some embodiments, the storage 503 is a removable medium. In some embodiments, the storage 503 is a fixed medium. In some embodiments, the storage 503 is internal to the computing system 500. In some embodiments, the storage 503 is external to the computing system 500. In some embodiments, the storage 503 is non-volatile, solid-state memory. In some embodiments, the storage 503 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 503 may include one or more memory devices. One or more program modules stored in the storage 503 may be configured to cause various operations and processes described herein to be executed.

The I/O interface 504 includes hardware, software, or both providing one or more interfaces for communication between the computing system 500 and one or more I/O devices. The computing system 500 may include one or more of these I/O devices, where appropriate. One or more of these I/O devices may enable communication between a person and the computing system 500. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 504 includes one or more device or software drivers enabling the processor(s) 501 to drive one or more of these I/O devices. The I/O interface 504 may include one or more I/O interfaces.

The communication interface 505 includes hardware, software, or both providing one or more interfaces for communication (such as, for example, packet-based communication) between the computing system 500 and one or more other computing systems or one or more networks. As an example and not by way of limitation, the communication interface 505 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 505 for it. As an example and not by way of limitation, the computing system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 500 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 500 may include any suitable communication interface 505 for any of these networks, where appropriate. The communication interface 505 may include one or more communication interfaces 505.

The bus 506 interconnects various components of the computing system 500 thereby enabling the transmission of data and execution of various processes. The bus 506 may include one or more types of bus structures including a memory bus or memory controller, a peripheral bus, and a local bus using any of a variety of bus architectures.

Various above-described operations performed by the computing system 101, the server computing system 102A, the server computing system 102B, and the server computing system 102C may be executed and/or controlled by one or more applications running on the computing system 101, the server computing system 102A, the server computing system 102B, and the server computing system 102C, respectively. The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a computer-readable storage medium storing instructions which, when executed by one or more processors, cause the one or more processors to perform one or more embodiments of the invention described herein. The scope of the present invention includes a computer-readable storage medium storing instructions which, when executed by one or more processors, cause the one or more processors to perform one or more embodiments of the invention described herein.

Examples of a computer-readable storage medium include a floppy disk, a hard disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:

1. A method of registering a security token at a computing device, the method comprising:
   receiving, at a computing device, a security token identifier and a request to access one or more resources of the computing device, the security token identifier comprising static information that identifies a security token which has been presented at the computing device;
   sending, from the computing device to a server computing system, a request to identify domains having a trust relationship with a domain associated with the computing device;
   receiving, at the computing device from the server computing system, a response to the request to identify domains having a trust relationship with the domain associated with the computing device, the response comprising information that identifies one or more domains each having a trust relationship with the domain associated with the computing device;
   determining that an entry in a first data store matches the security token identifier, the first data store associated with a first domain of the one or more domains each having a trust relationship with the domain associated with the computing device;
   in response to the determining that an entry in the first data store matches the security token identifier, updating a local data store at the computing device such that, in the local data store, the security token identifier is associated with first domain information that identifies the first domain; and
   granting the requested access to one or more resources of the computing device based on the trust relationship determined to exist between the domain associated with the computing device and the first domain.

2. The method of claim 1, wherein the receiving the security token identifier comprises receiving the security token identifier via a data input device, the security token identifier having been read directly from the security token by the data input device.

3. The method of claim 1, wherein the determining that an entry in the first data store matches the security token identifier comprises:
   sending, from the computing device to a directory service associated with the first domain, a request to search the first data store for an entry that matches the security token identifier; and
   receiving, at the computing device from the directory service associated with the first domain, an indication that an entry in the first data store matches the security token identifier.

4. The method of claim 1, wherein the updating the local data store comprises adding a user account to the local data store, the user account including the security token identifier and the first domain information as entries in the user account.

5. The method of claim 1, wherein the updating the local data store comprises:
   deleting second domain information from a user account in the local data store, the second domain information comprising information that identifies a second domain different from the first domain; and
   adding the first domain information to the user account such that the user account includes the security token identifier and the first domain information as entries in the user account.

6. The method of claim 1, further comprising:
   in response to the receiving the security token identifier and the request to access one or more resources of the computing device, determining whether an entry in the local data store matches the security token identifier,
   wherein the sending the request to identify domains having a trust relationship with the domain associated with the computing device is performed in response to determining that no entry in the local data store matches the security token identifier.

7. The method of claim 1, further comprising:
   in response to the receiving the security token identifier and the request to access one or more resources of the computing device, determining whether an entry in the local data store matches the security token identifier;
   in response to determining that an entry in the local data store matches the security token identifier, identifying a second domain based on second domain information that identifies the second domain, the second domain information associated with the security token identifier in the local data store, the second domain different from the first domain; and
   determining that no entry in a second data store matches the security token identifier, the second data store associated with the second domain,
   wherein the sending the request to identify domains having a trust relationship with the domain associated with the computing device is performed in response to the determining that no entry in the second data store matches the security token identifier.

8. The method of claim 1, further comprising:
   determining that no entry in a second data store matches the security token identifier, the second data store associated with a second domain of the one or more domains each having a trust relationship with the domain associated with the computing device, the second domain different from the first domain; and
   in response to the determining that no entry in the second data store matches the security token identifier, determining whether the first domain has been checked to determine whether an entry in the first data store matches the security token identifier,
   wherein the determining that an entry in the first data store matches the security token identifier is performed in response to determining that the first domain has not been checked to determine whether an entry in the first data store matches the security token identifier.

9. The method of claim 1, further comprising:
after the requested access to one or more resources of the computing device has terminated, receiving, at the computing device, the security token identifier and a second request to access one or more resources of the computing device;
determining that an entry in the local data store matches the security token identifier;
identifying the first domain based on the first domain information, the first domain information associated with the security token identifier in the local data store;
determining that an entry in the first data store matches the security token identifier; and
granting the second requested access to one or more resources of the computing device.

10. A non-transitory computer-readable medium storing instructions that, when executed by one or more processors, cause the one or more processors to perform operations comprising:
receiving, at a computing device, a security token identifier and a request to access one or more resources of the computing device, the security token identifier comprising static information that identifies a security token which has been presented at the computing device;
sending, from the computing device to a server computing system, a request to identify domains having a trust relationship with a domain associated with the computing device;
receiving, at the computing device from the server computing system, a response to the request to identify domains having a trust relationship with the domain associated with the computing device, the response comprising information that identifies one or more domains each having a trust relationship with the domain associated with the computing device;
determining that an entry in a first data store matches the security token identifier, the first data store associated with a first domain of the one or more domains each having a trust relationship with the domain associated with the computing device;
in response to the determining that an entry in the first data store matches the security token identifier, updating a local data store at the computing device such that, in the local data store, the security token identifier is associated with first domain information that identifies the first domain; and
granting the requested access to one or more resources of the computing device based on the trust relationship determined to exist between the domain associated with the computing device and the first domain.

11. A computing device comprising:
one or more processors; and
one or more computer-readable media coupled to the one or more processors, the one or more computer-readable media storing instructions that, when executed by the one or more processors, cause the one or more processors to perform operations comprising:
receiving, at the computing device, a security token identifier and a request to access one or more resources of the computing device, the security token identifier comprising static information that identifies a security token which has been presented at the computing device;
sending, from the computing device to a server computing system, a request to identify domains having a trust relationship with a domain associated with the computing device;
receiving, at the computing device from the server computing system, a response to the request to identify domains having a trust relationship with the domain associated with the computing device, the response comprising information that identifies one or more domains each having a trust relationship with the domain associated with the computing device;
determining that an entry in a first data store matches the security token identifier, the first data store associated with a first domain of the one or more domains each having a trust relationship with the domain associated with the computing device;
in response to the determining that an entry in the first data store matches the security token identifier, updating a local data store at the computing device such that, in the local data store, the security token identifier is associated with first domain information that identifies the first domain; and
granting the requested access to one or more resources of the computing device based on the trust relationship determined to exist between the domain associated with the computing device and the first domain.

12. The device of claim 11, wherein the receiving the security token identifier comprises receiving the security token identifier via a data input device, the security token identifier having been read directly from the security token by the data input device.

13. The device of claim 11, wherein the determining that an entry in the first data store matches the security token identifier comprises:
sending, from the computing device to a directory service associated with the first domain, a request to search the first data store for an entry that matches the security token identifier; and
receiving, at the computing device from the directory service associated with the first domain, an indication that an entry in the first data store matches the security token identifier.

14. The device of claim 11, wherein the updating the local data store comprises adding a user account to the local data store, the user account including the security token identifier and the first domain information as entries in the user account.

15. The device of claim 11, wherein the updating the local data store comprises:
deleting second domain information from a user account in the local data store, the second domain information comprising information that identifies a second domain different from the first domain; and
adding the first domain information to the user account such that the user account includes the security token identifier and the first domain information as entries in the user account.

16. The device of claim 11, the operations further comprising:
in response to the receiving the security token identifier and the request to access one or more resources of the computing device, determining whether an entry in the local data store matches the security token identifier,
wherein the sending the request to identify domains having a trust relationship with the domain associated with the computing device is performed in response to determining that no entry in the local data store matches the security token identifier.

17. The device of claim 11, the operations further comprising:
- in response to the receiving the security token identifier and the request to access one or more resources of the computing device, determining whether an entry in the local data store matches the security token identifier;
- in response to determining that an entry in the local data store matches the security token identifier, identifying a second domain based on second domain information that identifies the second domain, the second domain information associated with the security token identifier in the local data store, the second domain different from the first domain; and
- determining that no entry in a second data store matches the security token identifier, the second data store associated with the second domain, wherein the sending the request to identify domains having a trust relationship with the domain associated with the computing device is performed in response to the determining that no entry in the second data store matches the security token identifier.

18. The device of claim 11, the operations further comprising:
- determining that no entry in a second data store matches the security token identifier, the second data store associated with a second domain of the one or more domains each having a trust relationship with the domain associated with the computing device, the second domain different from the first domain; and
- in response to the determining that no entry in the second data store matches the security token identifier, determining whether the first domain has been checked to determine whether an entry in the first data store matches the security token identifier,
- wherein the determining that an entry in the first data store matches the security token identifier is performed in response to determining that the first domain has not been checked to determine whether an entry in the first data store matches the security token identifier.

19. The device of claim 11, the operations further comprising:
- after the requested access to one or more resources of the computing device has terminated, receiving, at the computing device, the security token identifier and a second request to access one or more resources of the computing device;
- determining that an entry in the local data store matches the security token identifier;
- identifying the first domain based on the first domain information, the first domain information associated with the security token identifier in the local data store;
- determining that an entry in the first data store matches the security token identifier; and
- granting the second requested access to one or more resources of the computing device.

* * * * *